United States Patent [19]

Sogo et al.

[11] 4,094,206

[45] June 13, 1978

[54] GEAR TRANSMISSION

[75] Inventors: Yoshitaka Sogo; Shuichiro Ida, both of Toyota, Japan

[73] Assignee: Tokyo Jidosha Kogyo Kabushiki Kaisha, Toyota, Japan

[21] Appl. No.: 614,528

[22] Filed: Sep. 18, 1975

[30] Foreign Application Priority Data

Apr. 2, 1975   Japan ..................................   50-39236

[51] Int. Cl.² .......................... F16H 3/04; F16H 3/08
[52] U.S. Cl. ........................ 74/360; 74/325; 74/333; 74/335
[58] Field of Search ................. 75/325, 329, 331, 333, 75/335, 343, 375, 359, 360, 745, 339

[56] References Cited

U.S. PATENT DOCUMENTS

| | | | |
|---|---|---|---|
| 2,115,089 | 4/1938 | Tenney | 74/333 |
| 2,449,586 | 9/1948 | Carnagua | 74/339 |
| 2,615,346 | 10/1952 | Simpson | 74/333 |
| 2,753,728 | 7/1956 | Kelbel | 74/333 |
| 3,645,147 | 2/1972 | Fodrea | 74/375 |
| 3,916,712 | 11/1975 | Kelbel et al. | 74/325 X |
| 3,929,029 | 12/1975 | Kelbel | 74/375 X |

FOREIGN PATENT DOCUMENTS

| | | | |
|---|---|---|---|
| 495,878 | 9/1953 | Canada | 74/333 |
| 1,188,598 | 4/1970 | United Kingdom | 74/325 |

*Primary Examiner*—Samuel Scott
*Assistant Examiner*—Carl F. Pietruszka
*Attorney, Agent, or Firm*—Finnegan, Henderson, Farabow & Garrett

[57] ABSTRACT

A gear transmission with overtop or overdrive for automotive vehicles includes an overdrive gear mechanism mounted immediately after the rear end wall of a transmission case. The overdrive gear mechanism includes a pair of overdrive gears, one located on the output shaft of the gear transmission and the other on the countershaft of the gear transmission, operable to rotate the output shaft at a higher rotational speed than the input shaft. An overdrive synchronizer assembly is mounted rearwardly of the overdrive gears such that the direction for actuating the overdrive synchronizer assembly coincides with the direction that a gear shift lever of the vehicle is shifted to obtain the overdrive position.

5 Claims, 10 Drawing Figures

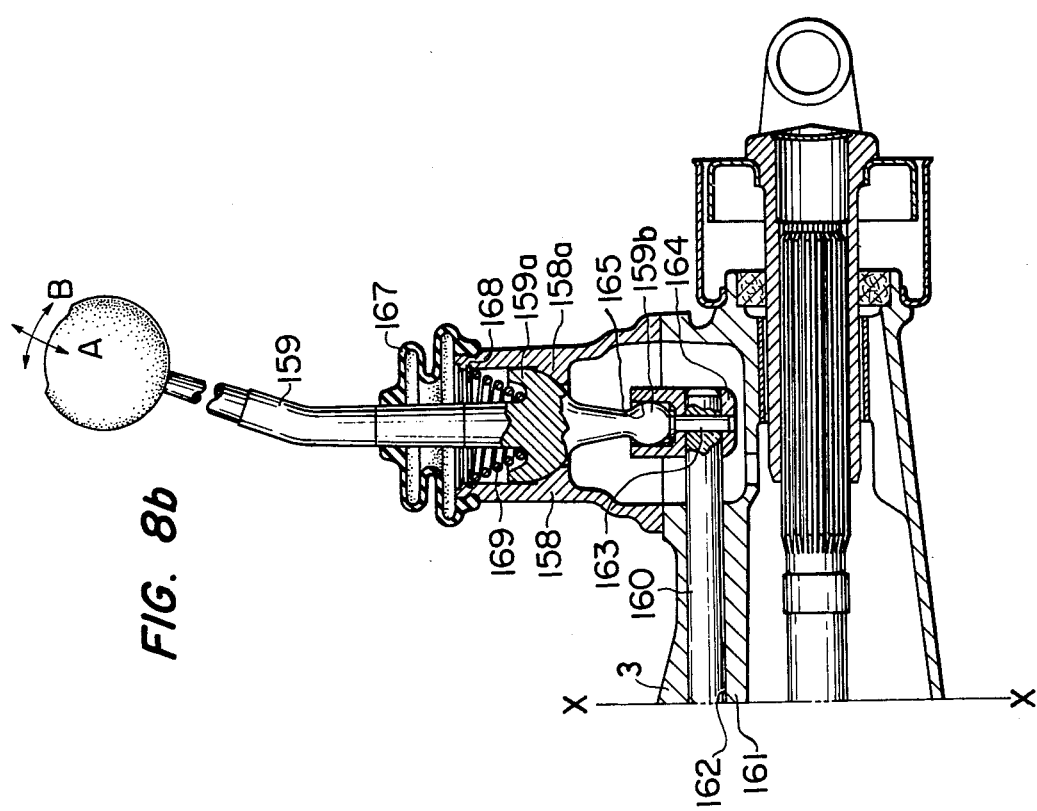

GEAR TRANSMISSION

BACKGROUND OF THE INVENTION

This invention relates to a gear transmission with overtop or overdrive for automotive vehicles. More particularly, this invention relates to a gear transmission having an overdrive gear mechanism mounted within an extension housing immediately after the rear end wall of a transmission case.

It has been advantageous to incorporate an overtop gear mechanism between a countershaft and an output shaft of a gear transmission in order to permit the engine to operate at a lower speed than that of a propeller shaft during vehicular operation at a high speed. This feature reduces fuel consumption as well as minimizing vibrations. However, gear transmissions of this type have been mounted only on the so-called sport cars in which the gear transmission is directly controlled, and not mounted on commercial cars having a remote-controlled type of gear transmission.

In general, the conventional gear transmissions with overdrive are of the five-speed and reverse type in which the fifth or overdrive gear shift position is located opposite to the fourth gear shift position, the fourth gear being a position at which the output shaft rotates at the same speed with that of the input shaft of the gear transmission. The overtop gear mechanism is mounted in an extension housing so that the gear transmission case and the transmission gears set therein may be compatible for both the conventional four-speed gear transmission and the five-speed gear transmission with overdrive.

Problems have been encountered in the conventional gear transmissions with overdrive of the type described. In general, an additional countershaft must be provided in order to mount a countershaft overdrive gear. The extension housing provided must also be bulged in order to enclose therein a countershaft overdrive gear of a large diameter. A shift reversing mechanism must be additionally mounted in order to make the gear shift lever direction the same as the actuating direction for engaging the overdrive gear to the output shaft.

Accordingly, it is a primary object of this invention to incorporate an overtop or overdrive gear mechanism in a remotely controlled type of gear transmission. Another object of this invention is to provide a new and improved gear transmission that eliminates the problems encountered in the conventional directly controlled or operated gear transmissions with overdrive.

Still another object of this invention is to provide a new and improved gear transmission with overdrive without an additional countershaft or shift reversing mechanism.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the gear transmission of this invention comprises: (1) a transmission case having front and rear end walls; (2) an input shaft and an output shaft rotatably and coaxially disposed within the transmission case, the input shaft extending through the front end wall of the transmission case and the output shaft extending through the rear end wall of the transmission case; (3) a countershaft rotatably disposed within the transmission case and parallel to the input and output shafts, the countershaft extending through the rear end wall of the transmission case; (4) a pair of drive gears, the first one mounted on the input shaft and the second one mounted on the countershaft, meshed with each other for transmitting the torque from the input shaft to the countershaft; (5) a plurality of pairs of transmission gears of different gear ratios for obtaining different speed ratios of the input shaft to the output shaft, the first gear of each pair of transmission gears being rigidly mounted on the countershaft and the second gear of each pair being rotatably mounted on the output shaft, the gears of each pair being meshed with each other; (6) a plurality of synchronizer assemblies mounted on the output shaft and selectively actuated for engagement with the transmission gears rotatably mounted on the output shaft for coupling one of the first transmission gears to the output shaft; (7) an overdrive mechanism including (a) a pair of overdrive gears, the first one rigidly mounted on the countershaft and the second one rotatably mounted on the output shaft, meshed with each other, and (b) an overdrive synchronizer assembly having a first part mounted on the output shaft and a second part fixedly mounted with respect to the first part, the first part being selectively actuated for engagement with the first overdrive gear for coupling the overdrive gear to the output shaft, the gear ratio of the overdrive gears being such that when the first overdrive gear is coupled to the output shaft, the output shaft is rotated at a higher rotational speed than the input shaft; and (8) a gear shift mechanism for selectively actuating one of the transmission synchronizer assemblies or the overdrive synchronizer assembly for changing the speed ratio of the input shaft to the output shaft as the gear transmission is shifted from one gear position to another.

The invention consists in the novel parts, constructions, arrangements, combinations and improvements shown and described. The accompanying drawings, which are incorporated in and constitute a part of this specification, illustrate several embodiments of the invention and, together with the description, serve to explain the principles of the invention.

BRIEF DESCRIPTION OF THE DRAWINGS

Of the drawings:

FIGS. 8a, 8b show complementary portions of a sectional view of a second embodiment of a gear transmission in accordance with the teachings of this invention; and FIG. 9 shows the gear shift pattern employed in the second embodiment of FIG. 8.

DETAILED DESCRIPTION OF THE DRAWINGS

Reference will now be made in detail to the present preferred embodiments of the invention, examples of which are illustrated in the accompanying drawings.

Referring now to FIGS. 1 through 7, there is shown a first embodiment of a gear transmission that is remotely operated and which employs the teachings of this invention.

Figure 1:
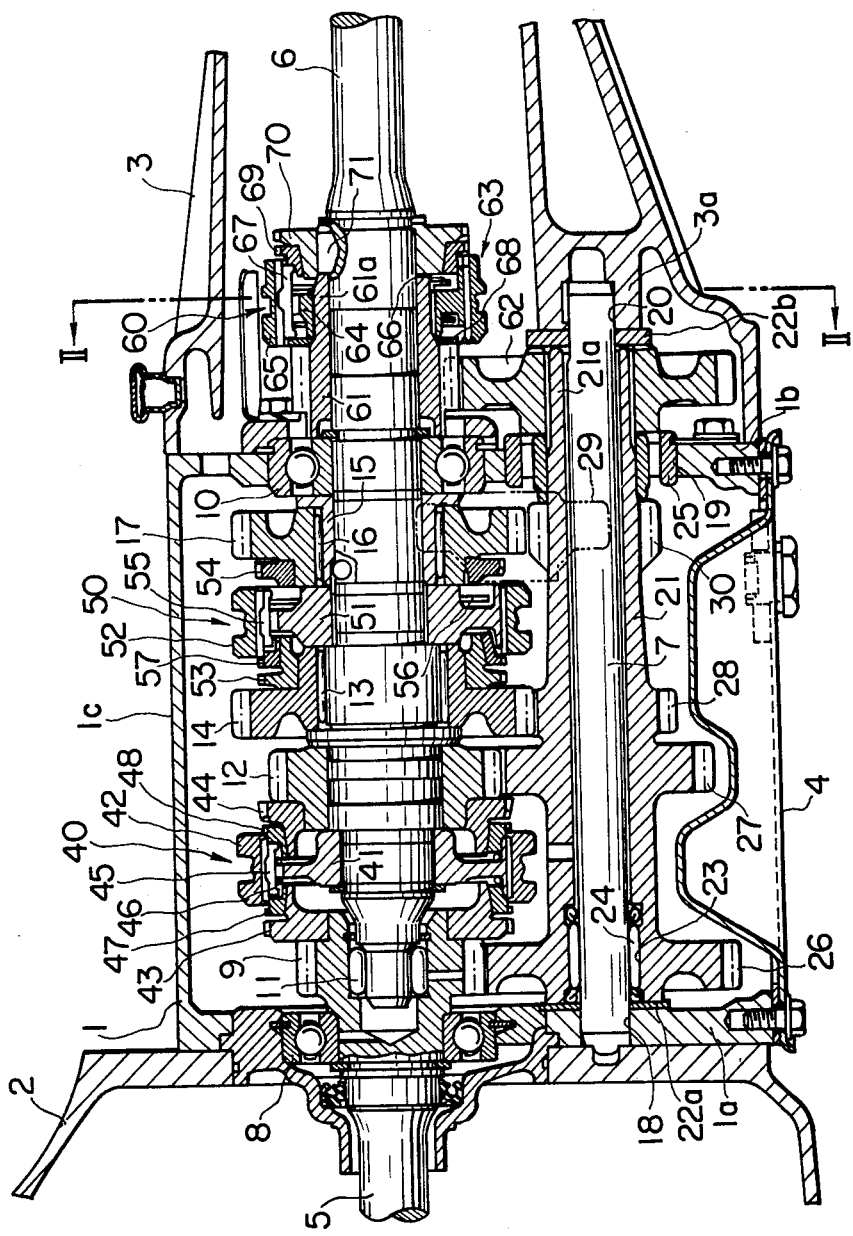
FIG. 1 is a sectional view of a first embodiment of a gear transmission in accordance with the teachings of this invention.

As shown in FIG. 1, a clutch housing 2 and an extension housing 3 are attached respectively to a front end wall 1a and a rear end wall 1b of a transmission case 1 with gaskets or the like interposed therebetween in the conventional manner. An undercover 4 is attached to the bottom opening of transmission case 1 to serve as a fluid pan. Within a side wall 1c of transmission case 1 and clutch and extension housings 2 and 3, there is disposed coaxially an input shaft 5 and an output shaft 6. A supporting member 7 is located in parallel with input and output shafts 5 and 6. Input shaft 5 is rotatably journalled by a radial ball bearing 8 which in turn is attached to front end wall 1a of transmission case 1. Input shaft 5 has at its one end a main drive gear 9. Output shaft 6 is rotatably supported rearwardly by a radial ball bearing 10 attached to rear end wall 1b of transmission case 1 and forwardly by rollers 11 located at the end of input shaft 5.

Preferably, a main second speed gear 12 of a small diameter is rotatably fitted on output shaft 6. A main first speed gear 14 of a large diameter is rotatably fitted over output shaft 6 through needle rollers 13 and is spaced apart rearwardly from main second speed gear 12 by a predetermined distance. Rearwardly of main first speed gear 14 there is a reverse gear 17 rotatably fitted over output shaft 6 through needle rollers 16 and a sleeve 15 attached to output shaft 6. Between main drive gear 9 and second speed gear 12, there is interposed a synchronizer assembly 40. Between first speed gear 14 and reverse speed gear 17, there is interposed a synchronizer assembly 50. Synchronizer assemblies 40 and 50 can be of a conventional type such as those made by Borg-Warner.

As here embodied, supporting member 7 has one end fitted into a hole 18 formed in front end wall 1a of transmission case 1, and the other end extended through an opening 19 formed in rear end wall 1b of transmission case 1 and fitted into a blind hole 20 formed in an inner projection 3a of extension housing 3. A countershaft 21 is fitted over supporting member 7 with thrust washer 22a interposed between front end wall 1a and the forward end of countershaft 21 and thrust washer 22b interposed between inner projection 3a of extension housing 3 and the rearward end of countershaft 21. The front portion of countershaft 21 is rotatably supported by needle rollers 24 disposed within an annular groove 23, while the rear portion of countershaft 21 is rotatably supported by a needle roller bearing 25 attached to opening 19 of rear end wall 1b of transmission case 1. Countershaft 21 carries a countershaft drive gear 26 in mesh with main drive gear 9, a countershaft second speed gear 27 of a large diameter in mesh with main second speed gear 12, a countershaft first speed gear 28 in mesh with main first speed gear 14, and a countershaft reverse gear 30 in mesh with an idler gear 29 which in turn is in mesh with main reverse gear 17.

As here embodied, synchronizer assembly 40 interposed between main drive gear 9 and main second speed gear 12 is provided with a clutch hub 41 attached to output shaft 6. A slidable sleeve 42 is splined over clutch hub 41 for axial displacement. Main drive gear 9 and main second speed gear 12 are provided with spline pieces 43 and 44, respectively. A plurality of shifting keys 45, each biased by the force of a spring 46, are interposed between clutch hub 41 and slidable sleeve 42. There is also provided synchronizer ring 47 for spline piece 43 and synchronizer ring 48 for spline piece 44 to attain synchronization by frictional engagement between the tapered portions of synchronizer rings 47 and 48 and spline pieces 43 and 44, respectively.

Synchronizer assembly 50 interposed between main first speed gear 14 and the main reverse speed gear 17 is substantially similar in construction to synchronizer assembly 40. The assembly includes a clutch hub 51, a slidable sleeve 52, spline piece 53 attached to main speed gear 14, spline piece 54 attached to main reverse speed gear 17, shifting keys 55, and springs 56. Since no synchronization is required when shifting to the reverse gear, only spline piece 53 on the side of main first speed gear 14 is provided with a synchronizing ring 57.

In accordance with the invention, the gear transmission includes an overdrive mechanism generally shown as 60. As here embodied, overdrive mechanism has a small diameter overdrive gear 61 rotatably fitted over output shaft 6 within extension housing 3 immediately behind rear end wall 1b of transmission case 1. Overdrive gear 61 is in mesh with a large diameter overdrive gear 62 splined to the extended portion 21a of countershaft 21 immediately behind needle roller bearing 25 which is attached to rear end wall 1b of transmission case 1. Rearwardly of overdrive gear 61 is disposed an overdrive synchronizer assembly 63. Overdrive synchronizer assembly 63 has a clutch hub 64 splined to a boss portion 61a of overdrive gear 61 extended in the direction remote from rear end wall 1b, and a slidable sleeve 65 fitted over clutch hub 64 for axial displacement. Shifting keys 67, each biased by the force of a spring 66, are interposed between slidable sleeve 65 and clutch hub 64. A stopper plate 68 is interposed between clutch hub 64 and overdrive gear 61 to prevent shifting keys 67 from being pulled out of the cage between clutch hub 64 and slidable sleeve 65. A spline piece 70 is attached to output shaft 6 in a conventional manner such as with a woodruff key 71, and is provided with a synchronizer ring 69.

The power from input shaft 5 is transmitted through main drive gear 9 and countershaft drive gear 26 in mesh therewith to countershaft 21. In doing so, main second speed gear 12, main first speed gear 14, main reverse speed gear 17 and overdrive gear 61 which are in mesh with countershaft second speed gear 27, countershaft first speed gear 28, countershaft reverse speed gear 30 and countershaft overdrive gear 62, respectively, are normally rotated. When slidable sleeve 42 of synchronizer assembly 40 is shifted forwardly to mesh with spline piece 43 through synchronizing ring 47, input shaft 5 is directly coupled to output shaft 6; that is, the transmission is shifted to the third speed gear position. On the other hand, when slidable sleeve 42 is shifted rearwardly to mesh with spline piece 44 through synchronizing ring 48, main second speed gear 12 is coupled to output shaft 6; that is, the transmission is shifted to the second speed gear position. When slidable sleeve 52 of synchronizer assembly 50 is shifted forwardly to mesh with spline piece 53 through synchronizing ring 57, main first speed gear 14 is coupled to output shaft 6; that is, the transmission is shifted to the first speed gear position. When slidable sleeve 52 is shifted rearwardly to mesh with spline piece 54, main reverse gear 17, in mesh with countershaft reverse gear 30 through idler gear 29, is coupled to output shaft 6; that is the transmission is shifted to the reverse speed gear position.

When slidable sleeve 65 of synchronizer assembly 63 in overdrive mechanism 60 is shifted rearwardly to mesh with spline piece 70 through synchronizing ring 69, overdrive gear 61 is coupled to output shaft 6; that is, the transmission is shifted to the overdrive speed gear position. During overdrive, a rotational speed higher than that of input shaft 5 is transmitted to output shaft 6 through clutch hub 64 rotating in unison with overdrive gear 61, slidable sleeve 64 and spline piece 70. The overdrive speed ratio is dependent upon the gear ratios of main drive gear 9 and countershaft drive gear 26, and of overdrive gear 61 and countershaft overdrive gear 62.

Figure 7:
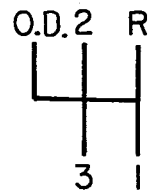
FIG. 7 shows the gear shift pattern employed in the first embodiment of FIG. 1.

As here embodied, and as best seen in FIG. 7, the gear shift positions are provided in an H-pattern. The first (1) and reverse (R) gear positions are opposite to each other in the same shift line on one side of the H-pattern. The second (2) and third (3) gear positions are opposite to each other in the same shift line on the other side of the H-pattern. Furthermore, the gear shift pattern is so arranged that a shift can not be made in the same direction when the gear shift is changed from the first gear position to the second gear position and from the second gear position to the third gear position. Moreover, the overdrive (O.D.) gear position is lateral of the other side of the H-pattern and in a direction opposite the third gear position.

Figure 2:
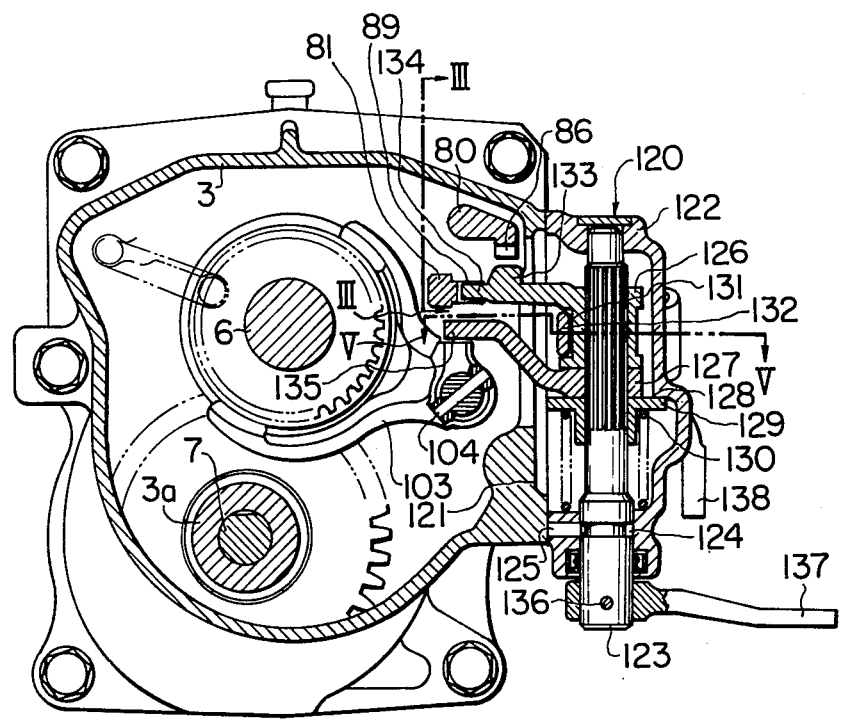
FIG. 2 is a sectional view taken along line II—II of FIG. 1.
Figure 3:
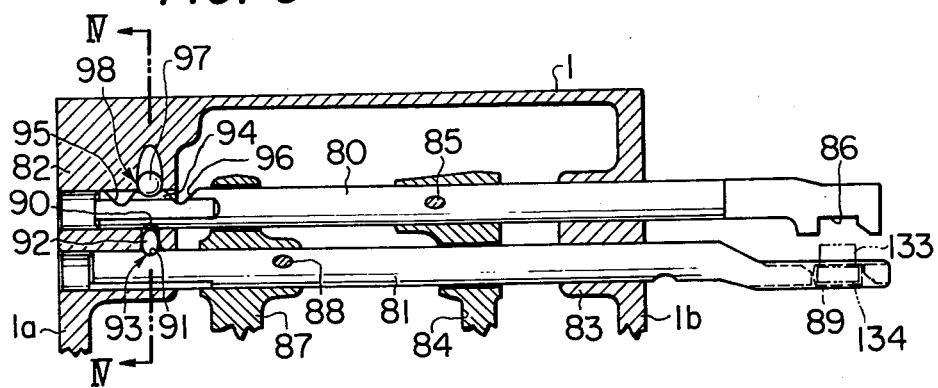
FIG. 3 is a sectional view taken along line III—III of FIG. 2.

Referring now to FIGS. 2 through 6, a gear shift mechanism is provided for selectively actuating one of slidable sleeves 42, 52 and 65 of synchronizer assemblies 40, 50 and 63 to shift the transmission from one gear position to another. As best shown in FIGS. 2 and 3, the gear shift mechanism includes a first-and-reverse gear fork shaft 80 and a second-and-third fork shaft 81 extended in parallel with each other laterally of synchronizing assemblies 40, 50 and 63 and slidably through an inner projection 82 extended inwardly from front end wall 1a of transmission case 1 and through a projection 83 extended inwardly from rear end wall 1b. A shift fork 84 coupled to slidable sleeve 52 of synchronizer assembly 50 is attached with a pin 85 to fork shaft 80. A downwardly opened engaging recess 86 of an inverted U-shaped cross section is formed at the rear end of fork shaft 80 as best shown in FIG. 3. A shift fork 87 coupled to slidable sleeve 42 of synchronizer assembly 40 is attached with a pin 88 to fork shaft 81. A laterally opened engaging recess 89 of a U-shaped cross section is formed at the rear end of fork shaft 81 in alignment with engaging recess 86 of fork shaft 80. The front end portions of fork shafts 80 and 81 are provided with recesses 90 and 91, respectively, in opposed relation with each other. A retaining pin 92 is selectively fitted into one of recesses 90 and 91. Recesses 90 and 91 and retaining pin 92 make up an interlocking means generally indicated by 93 for preventing the simultaneous axial displacement of fork shafts 80 and 81.

Figure 4:
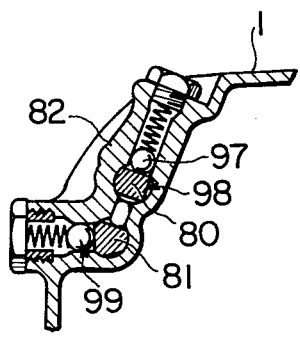
FIG. 4 is a sectional view taken along line IV—IV of FIG. 3.

As here embodied, first-and-reverse gear fork shaft 80 is provided at the front end portion thereof with retaining means generally indicated by 98 for retaining fork shaft 80 in one of the first, neutral, or reverse gear positions, thereby preventing the slipping out of gear. Preferably, retaining means 98 comprises three recesses 94, 95 and 96 formed in fork shaft 80 and a ball 97 that is biased by a spring and selectively fitted into one of recesses 94, 95 or 96, as best shown in FIGS. 3 and 4. Second-and-third gear fork shaft 81 is also provided with retaining means generally indicated by 99 (FIG. 4) substantially similar in construction to retaining means 98 for fork shaft 80.

Figure 5:
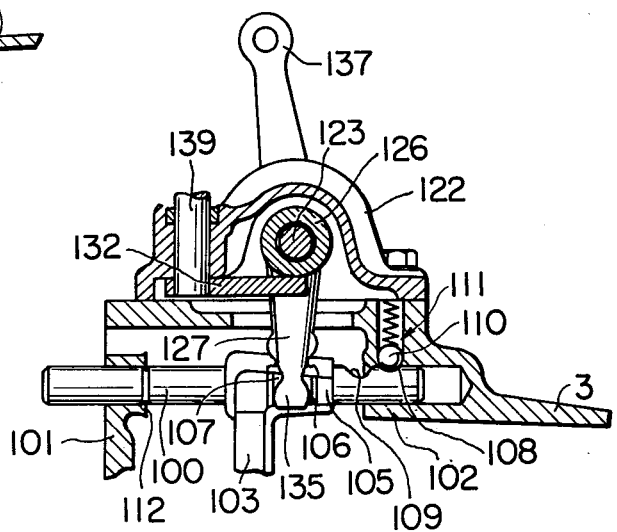
FIG. 5 is a sectional view taken along line V—V of FIG. 2.

As best shown in FIGS. 2 and 5, the gear shift mechanism further includes an overdrive gear fork shaft 100 slidably extended through projections 101 and 102 of extension housing 3 in parallel with and immediately below fork shaft 81. A shift fork 103 coupled to slidable sleeve 65 of overdrive synchronizer assembly 60 is attached with a pin 104 to overdrive gear fork shaft 100 as best shown in FIG. 2. Preferably, means such as a stopper plate 112 attached to projection 101 is provided for limiting the axial movement of fork shaft 100. An upwardly opened engaging recess 107 of a U-shaped cross section is formed in shift fork 103. Overdrive gear fork shaft 100 is provided with retaining means generally indicated by 111 for retaining fork shaft 100 in the neutral or overdrive gear position. Preferably, retaining means 111 comprises two axially spaced apart recesses 108 and 109 formed in the rear end portion of fork shaft 100, and a ball 110 that is biased by a spring and selectively fitted into one of recesses 108 or 109 as best shown in FIG. 5.

As here embodied, an internal selection means responsive to a gear shift lever is provided for selectively engaging one of the fork shafts. Referring again to FIGS. 2 and 5, internal selection means generally indicated by 120 is mounted on extension housing 3 adjacent to engaging recesses 86, 89 and 107 of fork shafts 80, 81 and 100, respectively. A cover 122 is attached to extension housing 3 so as to cover an opening 121 formed through extension housing 3. Preferably, internal selection means 120 includes a shift lever shaft 123 vertically extended within cover 122 and rotatably supported by cover 122. A retaining pin 125 is fitted into an annular groove 124 of shift lever shaft 123 so that the latter may be retained in position. A first inner shift lever 126 and a second inner shift lever 127 are splined over shift lever shaft 123. A return spring 130 is positioned between the bottom of cover 122 and a spring seat 129 which is slidably fitted over shift lever shaft 123. The upward movement of spring seat 129 is limited by a stepped portion 128 of cover 122.

First inner shift lever 126 is moved in an axial direction by an inner selecting lever 132 fitted into a lateral groove 131 of first inner shift lever 126. An inner portion of first inner shift lever 126 extended into extension housing 3 is provided with an engaging projection 133 for engagement with recess 86 of fork shaft 80 and another projection 134 for engagement with recess 89 of fork shaft 81. Projection 133 is located closer to the center of rotation of shift lever shaft 123 than projection 134. A portion of second inner shift lever 127 extended into extension housing 3 is provided with an engaging projection 135 for engagement with recess 107 of overdrive gear fork shaft 100 when second inner shift lever 127 is forced downwardly by first inner shift lever 126 against return spring 130. First inner shift lever 126 is biased toward return spring 130 under the force of a spring (not shown) so that spring seat 129 is normally pressed against stepped portion 128 and first and second inner shift levers 126 and 127 are normally pressed against each other. When no gear shift is made, only engaging projection 134 of first inner shift lever 126 is in engagement with recess 89 of fork shaft 81. An outer shift lever 137 is attached, such as with a pin 136, to shift lever shaft 123 carrying first and second inner shift levers 126 and 127. An outer selecting lever 138 is attached, such as with a shaft 139, to inner selecting lever 132.

Figure 6:
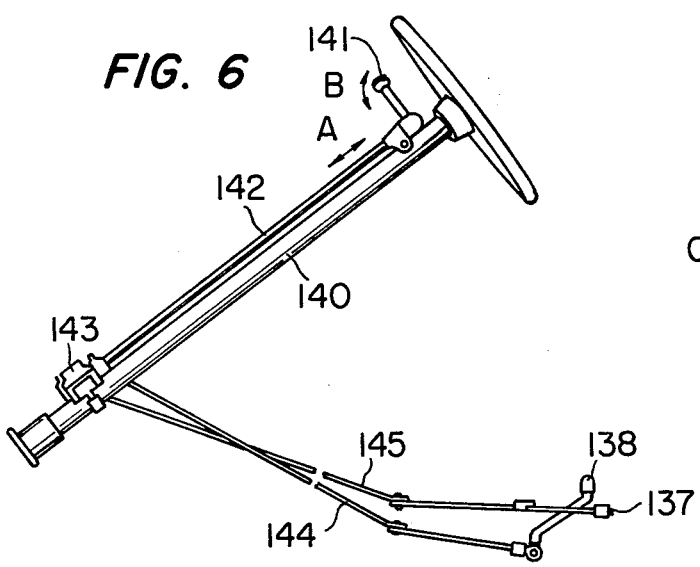
FIG. 6 is a perspective view of a remote control type column gear shift system.

Referring now to FIG. 6, a steering column gearshift lever includes a gear shift lever 141 coupled to a control shaft 142. Control shaft 142 extends in parallel with a steering shaft column 140 and is operatively coupled through cranks 143 to shift rods 144 and 145. Shift rod 144, in turn, is connected to outer selecting lever 138, and shift rod 145 is connected to outer shift lever 137.

The gear transmission of this first embodiment described above operates in the following manner. When gear shift lever 141 is not operated, engaging projection 134 of first inner shift lever 126 of inner selection means 120 is in engagement with recess 89 of fork shaft 81 as previously described. When gear shift lever 141 is operated in the direction indicated by the arrow B, outer shift lever 137 causes shift lever shaft 123 to rotate so that fork shaft 81 is shifted in the axial direction thereof. As a result, shift fork 87 of fork shaft 81 causes slidable sleeve 42 of synchronizer assembly 40 to be brought into engagement with spline piece 43 or 44. Thereby, the transmission is shifted to the second or third speed gear position. When gear shift lever 141 is shifted upwardly in the direction indicated by the arrow A, both outer selecting lever 138 and inner selecting lever 132 are rotated in one direction so that only first inner shift lever 126 of inner selection means 120 is moved upwardly. As a result, engaging projection 134 is pulled out of recess 89 of fork shaft 81 while projection 133 is brought into engagement with recess 86 of fork shaft 80. When the gear shift lever 141 is further operated in a direction indicated by the arrow B, first inner shift lever 126 is rotated so that shift fork 84 of fork shaft 80 causes slidable sleeve 52 of synchronizer assembly 50 to be brought into engagement with spline piece 53 or 54. Thus, the transmission is shifted to the first or reverse speed gear position.

When gear shift lever 141 is shifted downwardly in the direction indicated by the arrow A, outer selecting lever 138 and inner selecting lever 132 are rotated in the opposite direction so that both inner shift levers 126 and 127 are forced downwardly against return spring 130, causing spring seat 129 to move downwardly also. As a result, engaging projection 135 of second inner shift lever 127 is brought into engagement with recess 107 of fork shaft 100. When the gear shift lever 141 is operated in the direction indicated by the arrow B in which fork shaft 100 can be displaced, second inner shift lever 127 displaces fork shaft 100, so that shift fork 103 of fork shaft 100 causes slidable sleeve 65 of synchronizer assembly 63 to be displaced rearwardly. Thus, the transmission is shifted to the overdrive speed gear position. As previously mentioned, the gear shift pattern utilized in this embodiment is shown in FIG. 7.

Figure 8A:
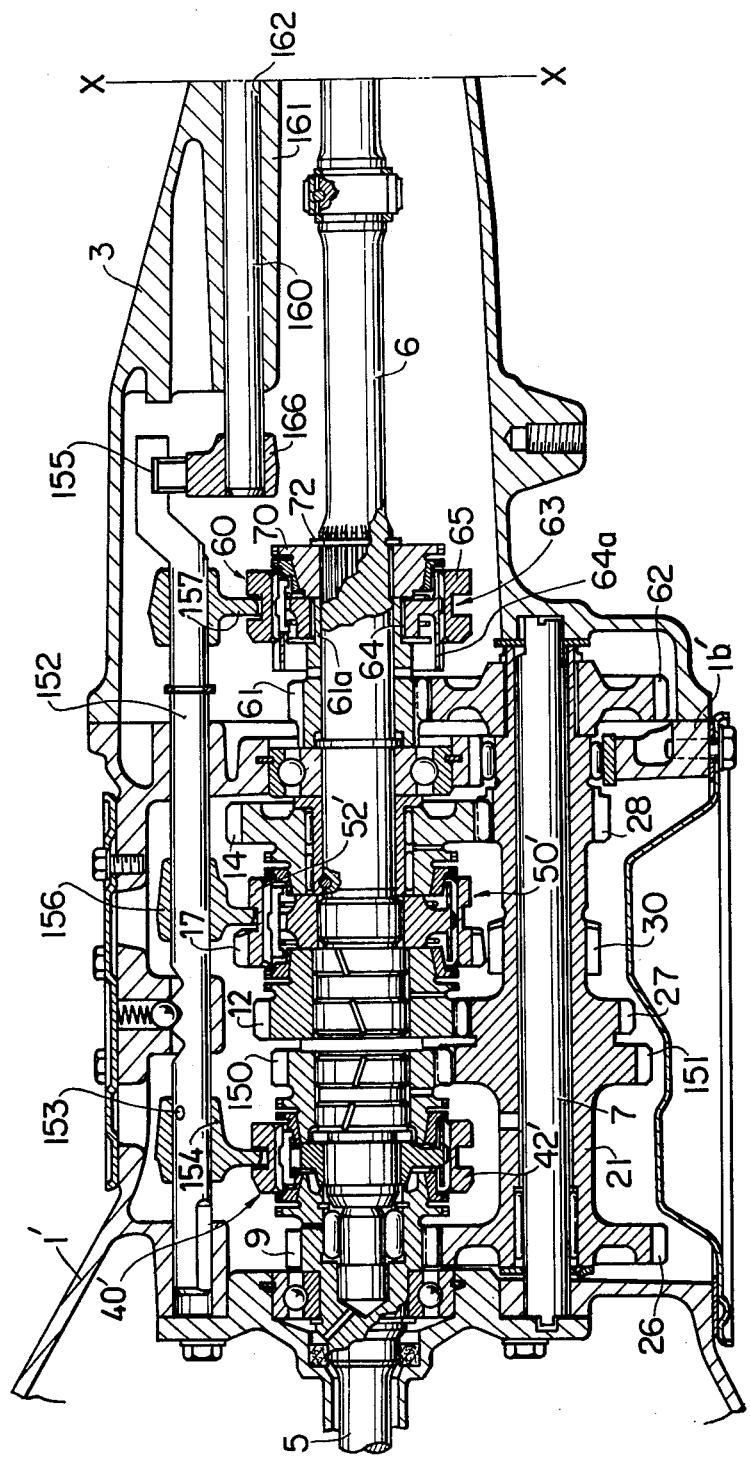

Referring now to FIGS. 8 and 9, there is shown a second embodiment of a gear transmission that is directly operated and which employs the teachings of this invention. Reference will be primarily directed to the structure and operational differences of this embodiment.

Similar to the first embodiment, input shaft 5 and output shaft 6 are disposed coaxially within a transmission case 1' formed integral with a clutch housing and attached with extension housing 3. Countershaft 21 is rotatably mounted on supporting member 7, and main drive gear 9 is in mesh with countershaft drive gear 26 so that as input shaft 5 rotates, the countershaft 21 is normally rotated. Unlike the first embodiment, a third speed gear 150, second speed gear 12, and first speed gear 14 are mounted upon output shaft 6 in the order named from front to rear. Countershaft 21 carries a countershaft third speed gear 151 in mesh with third speed gear 150, countershaft second speed gear 27 in mesh with second speed gear 12, and countershaft first speed gear 28 in mesh with first speed gear 14. A synchronizer assembly 50' is interposed between second speed gear 12 and first speed gear 14. The reverse gear 17 is formed integral with a slidable sleeve 52' of synchronizer assembly 50' and is in mesh with countershaft reverse gear 30 through an idler gear (not shown). A synchronizer assembly 40' with a slidable sleeve 42' is interposed between main drive gear 9 and third speed gear 150. Synchronizer assemblies 40' and 50' can be constructed in a similar manner as those described for the first embodiment.

As with the first embodiment and in accordance with the invention, the gear transmission includes an overdrive mechanism generally shown as 60. Overdrive mechanism 60 includes overdrive gear 61 in mesh with countershaft overdrive gear 62 and overdrive synchronizing assembly 63, all of which are disposed immediately behind the rear end wall 1b' of transmission case 1'. Overdrive synchronizer assembly 63 has clutch hub 64 splined to boss portion 61a of overdrive gear 61 and slidable sleeve 65 fitted over clutch hub 64 for axial displacement. Clutch hub 64 has a splined portion 64a extended axially forwardly. Spline piece 70 is splined to output shaft 6 rearwardly of clutch hub 64 and is retained in position by a snap ring 72 fitted over output shaft 6. During a shift to a reverse speed gear position, sleeve 65 is slidably moved axially forwardly on splined portion 64a of clutch hub 64.

The power from input shaft 5 through countershaft 21 to output shaft 6 is transmitted in the following manner. When slidable sleeve 42' of synchronizer assembly 40' is shifted forwardly, input shaft 5 is directly coupled to output shaft 6; that is, the transmission is shifted to the fourth speed gear position. When sleeve 42' is shifted rearwardly, third speed gear 150 is coupled to output shaft 6; that is, the transmission is shifted to the third speed gear position. When slidable sleeve 52' of synchronizer assembly 50' is shifted, the transmission is shifted to either the second or first speed gear position.

When slidable sleeve 65 of overdrive synchronizer assembly 63 is shifted rearwardly, in other words, opposite to the direction for shifting to the fourth speed gear position, the gear transmission is shifted to the overdrive speed gear position. When slidable sleeve 65 is shifted axially forwardly, reverse gears 17 and 30 are in mesh with each other through an idler gear (not shown) axially moved forwardly, so that the gear transmission is shifted to the reverse speed gear position.

Therefore, as has been seen in FIG. 9, a gear shift pattern is provided having the first (1) and second (2) gear positions opposite to each other in the same shift line; the third (3) and fourth (4) gear positions opposite to each other in the same shift line; and the overdrive (O.D.) and reverse (R) gear positions opposite in the same shift line. The relation between the second and third gear positions is similar to that between the fourth and overdrive gear positions. A shift must be made in the opposite direction to obtain the third gear position from the second gear position or from the fourth gear position to the third gear position.

In accordance with the invention, a gear shift mechanism is provided for selectively actuating one of slidable sleeves 42', 52' and 65 of synchronizer assemblies 40', 50' and 63 to shift the transmission from one gear position to another. Preferably, the gear shift mechanism includes a plurality of gear fork shafts in parallel with each other axially and slidably disposed within extension housing 3 and transmission case 1'. Fourth-and-third gear fork shaft 152 is provided at the rear end with an engaging recess 155. A shift fork 154 operatively coupled to slidable sleeve 42' of synchronizer assembly is attached to fork shaft 152 with a pin 153. The shift forks 156 and 157 operatively coupled to slidable sleeves 52' and 65, respectively, are attached respectively to a second-and-first gear fork shaft and an overdrive-and-reverse gear fork shaft (not shown) disposed on both sides of fork shaft 152. Another shift fork (not shown) is provided on the overdrive-and-reverse gear fork shaft in front of the shift fork 157 operatively coupled to the idler gear (not shown). The second-and-first and overdrive-and-reverse gear fork shafts are similarly provided at their rear ends with engaging recesses (not shown) in alignment with recess 155 of gear fork shaft 152.

As here embodied, the gear shift mechanism has a gear shift lever 159 disposed within a retainer 158 attached to the rear end portion of extension housing 3 in such a manner that an upper spherical portion 159a of gear shift lever 159 is brought into contact with a spherical seat 158a of retainer 158. There is further provided rod selection means responsive to gear shift lever 159 for selectively engaging one of the gear fork shafts. Preferably, between gear shift lever 159 and recess 155 of fourth-and-third gear fork shaft 152, there is extended an intermediate rod 160 for axial movement in a hole 162 drilled through a projection portion 161 of extension housing 3. A housing 164 is attached to the rear end of intermediate rod 160 such as with a pin 163. A lower spherical portion 159b of gear shift lever 159 is fitted into a recess 165 of housing 164 in such a manner that when gear shift lever 159 is shifted in the directions indicated by the double-pointed arrow B, intermediate rod 160 is displaced in the axial direction thereof, and when gear shift lever 159 is shifted in the directions indicated by the double-pointed arrow A, intermediate rod 160 is rotated about its axis. A shift and select lever 166 is attached to the front end of intermediate rod 160 for engagement with recess 155 of fourth-and-third gear fork shaft 152. The open top of retainer 158 is covered with a dust-preventing boot 167. A spring 169 is positioned between upper spherical portion 159a of gear shift lever 159 and a snap ring 168 located at the opening of retainer 158. Gear shift lever 159 is normally held upright by a select return mechanism (not shown) in the neutral position. In this position, shift and select lever 166 is engaged with recess 155 of fourth-and-third gear fork shaft 152 which is the most frequently operated fork shaft compared with the other two previously mentioned fork shafts (not shown).

When gear shift lever 159 is shifted leftwardly in the direction indicated by the arrow A relative to the direction of travel of the vehicle, the lower spherical portion 159b axially rotates the intermediate rod 160 in a clockwise direction so that the shift and select lever 166 engages the recess (not shown) of the second-and-first gear fork shaft (not shown). Accordingly, lower spherical portion 159b is operatively coupled to shift fork 156 of second-and-first gear fork shaft (not shown). When gear shift lever 159 is shifted in the directions indicated by the arrow B, shift fork 156 causes slidable sleeve 52' of synchronizer assembly 50' to be axially displaced in either of the directions. Thus, the transmission is shifted to the first or second speed gear position. When gear shift lever 159 is shifted rightwardly in the direction indicated by the arrow A to an upright position, the lower spherical portion 159b axially rotates the intermediate rod 160 in a counterclockwise direction so that the shift and select lever 166 engages the recess 155 of the fourth-and-third gear fork shaft 152. Accordingly, lower spherical portion 159b is operatively coupled to shift fork 154. When gear shift lever 159 is then shifted in the directions indicated by the arrow B, shift fork 154 of the fourth-and-third gear fork shaft 152 causes slidable sleeve 42' of synchronizer assembly 40' to be axially displaced in either of the directions. Thus, the transmission is shifted to the third or fourth speed gear position.

When gear shift lever 159 is shifted rightwardly in the direction indicated by the arrow A relative to the direction of travel of the vehicle, the lower spherical portion 159b axially rotates the intermediate rod 160 in a counterclockwise direction so that the shift and select lever 166 engages the recess (not shown) of the overdrive-and-reverse gear fork shaft (not shown). Accordingly, lower spherical portion 159b is operatively coupled to shift fork 157 of overdrive-and-reverse gear fork shaft (not shown). When gear shift lever 159 is shifted forwardly in the direction indicated by the arrow B, shift fork 157 of the overdrive-and-reverse gear fork shaft is moved rearwardly to cause slidable sleeve 65 of overdrive synchronizer assembly 63 to be displaced rearwardly for engagement with spline piece 70. Thus, the transmission is shifted to the overdrive speed gear position. When gear shift lever 159 is shifted rearwardly in the direction indicated by the arrow B, while shift fork 157 causes slidable sleeve 65 to slide forwardly on the splined portion 64a of the clutch hub, the reverse shift fork secured to the overdrive-and-reverse gear fork shaft is also moved forwardly to cause the idler gear to be displaced forwardly for engagement with the rear gears 17 and 18. Thus, reverse gears 17 and 30 are engaged with each other through the idler gear (not shown) and the transmission is shifted to a reverse speed gear position. Reference is made to the Japanese Patent Publication No. 1057/1975, assigned to the same firm as is this application, to more fully disclose the mechanism for displacing the idler gear (not shown) mentioned above for obtaining the reverse gear position. As previously mentioned, the gear shift pattern utilized in this embodiment is shown in FIG. 9.

As can be seen from the foregoing, a gear transmission of a remote controlled type, as well as a directly controlled type, can be provided with the overdrive mechanism in accordance with the invention. Therefore, when gear transmissions of a remote controlled type are mounted on commercial vehicles with an overdrive mechanism according to the invention, fuel consumption as well as vibrations at high vehicular speeds can be considerably reduced.

It is further noted that in the first embodiment of the invention, the overdrive gear position is in an opposite direction to the third speed gear position. This provides a smooth gear shift operation and minimizes a gear shifting position error. In the second embodiment of the invention, the overdrive mechanism is so arranged that the shifting direction to obtain an overdrive gear position is opposite to the shifting direction for obtaining the fourth speed gear position. As a result, a shift reversing mechanism may be eliminated.

As can be seen, the invention employs an overdrive mechanism mounted adjacent to the rear end wall of the transmission case. Further, since the countershaft overdrive gear is mounted on the countershaft extension which serves as a cantilever, there is no requirement to support the free end of the countershaft extension 21. As a result of the foregoing, the overdrive mechanism can be very simply constructed.

It is to be understood that the invention could be applied to a gear transmission having a transmission gear train other than the one described in these preferred embodiments. It will be apparent to those skilled in the art that various modifications and variations could be made in the gear transmission of the invention without departing from the scope or spirit of the invention.

What is claimed is:

1. A gear transmission comprising:
   (a) a transmission case having front and rear end walls;
   (b) an input shaft and an output shaft rotatably and coaxially disposed within said transmission case, said input shaft extending through said front end wall and said output shaft extending through said rear end wall of said transmission case;
   (c) a countershaft rotatably disposed within said transmission case and parallel to said input and output shafts, said countershaft extending through said rear end wall of said transmission case;
   (d) first and second drive gears housed in said transmission case, said first drive gear being mounted on said input shaft and meshed with said second drive gear mounted on said countershaft for transmitting torque from said input shaft to said countershaft;
   (e) a plurality of pairs of transmission gears of different gear ratios housed in said transmission case for obtaining different speed ratios of said input shaft to said output shaft, the first gear of each transmission gear pair being rigidly mounted on said countershaft and the corresponding second gear of each pair rotatably mounted on said output shaft, and wherein said pairs include a first speed gear rotatably fitted on said output shaft rearwardly from said first drive gear, a second speed gear rotatably fitted on said output shaft between said first drive and first speed gears, said first and second speed gears being meshed with corresponding first and second speed gears fixedly mounted on said countershaft, and a reverse speed gear rotatably fitted on said output shaft rearwardly of said first speed gear and operatively engaged with the corresponding reverse speed gear fixedly mounted on said countershaft;
   (f) a plurality of transmission synchronizer assemblies mounted within said transmission case on said output shaft and selectively engageable with said first drive gear and said transmission gears rotatably mounted on said output shaft for coupling said gears to said output shaft, and wherein said assemblies include
     (i) a first assembly mounted between said first drive gear and said second speed gear rotatably fitted on said output shaft, said first assembly comprising a first clutch hub fixed to said output shaft, a first spline element fixed to said first drive gear, a second spline element fixed to said second speed gear rotatably fitted to said output shaft, a first slidable sleeve splined over said first clutch hub for axial movement and engagement with said first or second spline elements, a first synchronizer ring adjacent to said first spline element, a second synchronizer ring adjacent to said second spline element, springs, and a plurality of shifting keys biased by said springs and interposed between said first clutch hub and said first sleeve; and
     (ii) a second assembly mounted on said output shaft between said first speed gear and reverse speed gear rotatably fitted on said output shaft, said second assembly comprising a second clutch hub attached to said output shaft, a third spline element fixed to said first speed gear rotatably fitted to said output shaft, a fourth spline element fixed to said reverse speed gear rotatably fitted to said output shaft, a second slidable sleeve splined over said clutch hub for axial movement and engagement with said third or fourth spline elements, a synchronizer ring adjacent to said third spline element, second springs, and a plurality of shifting keys biased by said second springs and interposed between said second clutch hub and said second sleeve;
   (g) an overdrive mechanism mounted outside and adjacent to said rear end wall of said transmission case including
     (i) first and second overdrive gears continuously meshed with each other, said first overdrive gear being rigidly mounted on that portion of said countershaft adjacent to and extending through said rear wall, and said second overdrive gear being rotatably mounted on that portion of said output shaft adjacent to and extending through said rear wall and being formed with a boss portion extending in the direction remote from said rear wall, and
     (ii) an overdrive synchronizer assembly comprising a spline element rigidly mounted on said output shaft rearwardly of said second overdrive gear and adjacent said boss portion remote from said rear wall, a synchronizing ring, a clutch hub integrally secured to said boss portion, a slidable sleeve spline-coupled to said overdrive clutch hub and selectively actuated for axial movement rearwardly to mesh with said overdrive spline element for coupling said second overdrive gear to said output shaft, springs, a plurality of shifting keys biased by said overdrive springs and interposed between said overdrive clutch hub and sleeve, and a stopper plate interposed between said overdrive clutch hub and said second overdrive gear for maintaining said overdrive shifting keys between said overdrive clutch hub and sleeve, and wherein the gear ratio of said first and second overdrive gears are such that when said second overdrive gear is coupled to said output shift, said output shaft is rotated at a higher rotational speed than said input shaft; and (h) a gear shift mechanism for selectively actuating one of said transmission synchronizer assemblies or said overdrive synchronizer assembly for changing the speed ratio of said input shaft to said output shaft as said gear transmission is shifted from one gear position to another, and wherein the position of said gear shift mechanism in the gear shift pattern for actuating said overdrive synchronizer assembly is opposite to the position of said gear shift mechanism for actuating the one of said transmission synchronizer assemblies obtaining the highest transmission gear ratio, and wherein said gear shift mechanism includes
  (i) a gear shift lever having first, second, third, reverse, overdrive and neutral positions;
  (ii) a first-and-reverse gear fork shaft and a second-and-third gear fork shaft for axial displacement, said shafts being parallel to each other and lateral to said first and second synchronizer assemblies;
  (iii) a first shift fork coupled to said slidable sleeve of said first synchronizer assembly and to said second-and-third gear fork shaft, and a second shift fork coupled to said slidable sleeve of said second synchronizer assembly and to said first-and-reverse gear fork shaft;
  (iv) means for retaining said first-and-reverse gear fork shaft in a neutral, first, or reverse gear position, and means for retaining said second-and-third gear fork shaft in a neutral, second or third gear position;
  (v) means for preventing simultaneous axial displacement of said fork shafts;
  (vi) an overdrive gear fork shaft for axial displacement parallel and adjacent to said first-and-reverse and second-and-third gear fork shafts;
  (vii) an overdrive shift fork coupled to said slidable sleeve of said overdrive synchronizer assembly and to said overdrive fork shaft;
  (viii) means for limiting the axial displacement of said overdrive fork shaft;
  (ix) means for retaining said overdrive fork shaft in a neutral or overdrive gear position; and
  (x) internal selection means responsive to the position of said gear shift lever for selectively engaging one of said gear fork shafts for moving one of said slidable sleeves into engagement with one of said first drive, transmission or overdrive gears.

2. The gear transmission as recited in claim 1 wherein said internal selection means includes:
  (a) a rotatable shift lever shaft;
  (b) a first inner shift lever splined over said shift lever shaft, said first inner shift lever being engageable with said first-and-reverse and second-and-third gear fork shafts;
  (c) a second inner shift lever splined over said shift lever shaft, said second inner shift lever being engageable with said overdrive fork shaft when actuated by said first inner shift lever;
  (d) inner selecting lever means for displacing said first inner shift lever in an axial direction;
  (e) an outer shift lever operatively connected to said shift lever shaft and said gear shift lever, said outer shift lever rotating said shift lever shaft in response to said gear shift lever; and
  (f) an outer selecting lever operatively connected to said inner selecting lever means and said gear shift lever, said outer selecting lever actuating said inner selecting lever means in response to said gear shift lever.

3. A gear transmission comprising:
  (a) a transmission case having front and rear end walls;
  (b) an input shaft and an output shaft rotatably and coaxially disposed within said transmission case, said input shaft extending through said front end wall and said output shaft extending through said rear end wall of said transmission case;
  (c) a countershaft rotatably disposed within said transmission case and parallel to said input and output shafts, said countershaft extending through said rear end wall of said transmission case;
  (d) first and second drive gears housed in said transmission case, said first drive gear being mounted on said input shaft and meshed with said second drive gear mounted on said countershaft for transmitting torque from said input shaft to said countershaft;
  (e) a plurality of pairs of transmission gears of different gear ratios housed in said transmission case for obtaining different speed ratios of said input shaft to said output shaft, wherein said pairs include a first speed gear rotatably fitted on said output shaft rearwardly from said first drive gear, a second speed gear rotatably fitted on said output shaft between said first drive and first speed gears, said first and second speed gears being meshed with corresponding first and second speed gears fixedly mounted on said countershaft, and a reverse speed gear rotatably fitted on said output shaft rearwardly of said first speed gear and operatively engaged with a corresponding reverse speed gear fixedly mounted on said countershaft;
  (f) a plurality of transmission synchronizer assemblies mounted within said transmission case on said output shaft and selectively engageable with said first drive gear and said transmission gears rotatably mounted on said output shaft for coupling said gears to said output shaft, and wherein said assemblies include
    (i) a first assembly mounted between said first drive gear and said second speed gear rotatably fitted on said output shaft, said first assembly having a portion axially movable forwardly for engagement with said first drive gear and rearwardly for engagement with said second speed gear;
    (ii) a second assembly mounted on said output shaft between said first speed gear and reverse speed gear rotatably fitted on said output shaft, said second assembly having a portion axially movable forwardly for engagement with said first speed gear and rearwardly for engagement with said reverse speed gear;
  (g) an overdrive mechanism mounted outside and adjacent to said rear end wall of said transmission case including
    (i) first and second overdrive gears continuously meshed with each other, said first overdrive gear being rigidly mounted on that portion of said countershaft adjacent to and extending through said rear wall, and said second overdrive gear being rotatably mounted on that portion of said output shaft adjacent to and extending through said rear wall and being formed with a boss portion extending in the direction remote from said rear wall, and (ii) an overdrive synchronizer assembly comprising a spline element rigidly mounted on said output shaft rearwardly of said second overdrive gear and adjacent said boss portion remote from said rear wall, a clutch hub integrally secured to said boss portion, and a slidable sleeve spline-coupled to said overdrive clutch hub and selectively actuated for axial movement rearwardly to mesh with said overdrive spline element for coupling said second overdrive gear to said output shaft, wherein the gear ratio of said first and second overdrive gears are such that when said second overdrive gear is coupled to said output shaft said output shaft is rotated at a higher rotational speed than said input shaft; and (h) a gear shift mechanism for selectively actuating one of said transmission synchronizer assemblies or said overdrive synchronizer assembly for changing the speed ratio of said input shaft to said output shaft as said gear transmission is shifted from one gear position to another, said gear shift mechanism including (i) a gear shift lever having a predetermined gear shift pattern wherein the position of said gear shift lever for actuating said overdrive synchronizer assembly is opposite to the position of said gear shift lever for actuating the transmission synchronizer assembly obtaining the highest transmission speed gear ratio;

(ii) an axially movable first-and-reverse gear fork shaft coupled to said movable portion of said second assembly and an axially movable second-and-third gear fork shaft coupled to said movable portion of said first assembly;

(iii) an axially movable overdrive gear fork shaft coupled to said slidable sleeve of said overdrive synchronizer assembly; and (iv) internal selection means responsive to the position of said gear shift lever for selectively engaging and moving one of said gear fork shafts, wherein said second-and-third gear fork shaft is moved forwardly for axially moving forwardly said first assembly portion into engagement with said first drive gear to establish the highest transmission speed gear ratio.

4. A gear transmission comprising:

(a) a transmission case having front and rear end walls;

(b) an input shaft and an output shaft rotatably and coaxially disposed within said transmission case, said input shaft extending through said front end wall of said transmission case and said output shaft extending through said rear end wall of said transmission case;

(c) a countershaft rotatably disposed within said transmission case and parallel to said input and output shafts, said countershaft extending through said rear end wall of said transmission case;

(d) first and second drive gears housed in said transmission case, said first drive gear being mounted on said input shaft and meshed with said second drive gear mounted on said countershaft for transmitting torque from said input shaft to said countershaft;

(e) a plurality of pairs of transmission gears of different gear ratios housed in said transmission case for obtaining different speed ratios of said input shaft to said output shaft, wherein said pairs include a first speed gear rotatably fitted on said output shaft rearwardly from said first drive gear, a second speed gear rotatably fitted on said output shaft between said first drive and first speed gears, a third speed gear rotatably fitted on said output shaft between said first drive and second speed gears, said first, second, and third speed gears being meshed with corresponding first, second, and third speed gears fixedly mounted on said countershaft, and a reverse speed gear fixedly mounted on said output shaft selectively engageable with a corresponding reverse speed gear fixedly mounted on said countershaft;

(f) a plurality of transmission synchronizer assemblies mounted within said transmission case on said output shaft and selectively engageable with said first drive gear and said transmission forward speed gears rotatably mounted on said output shaft for coupling said gears to said output shaft, and wherein said plurality of assemblies include (i) a first assembly mounted between said first drive gear and said third speed gear rotatably fitted on said output shaft, said first assembly having a portion axially movable forwardly for engagement with said first drive gear and rearwardly for engagement with said third speed gear;

(ii) a second assembly mounted between said first and second speed gears rotatably fitted on said output shaft, said second assembly having a portion axially movable forwardly for engagement with said second speed gear and rearwardly for engagement with said first speed gear, and wherein said reverse speed gear is mounted on said second assembly;

(g) an overdrive mechanism mounted outside and adjacent to said rear end wall of said transmission case including (i) first and second overdrive gears continuously meshed with each other, said first overdrive gear being rigidly mounted on that portion of said countershaft adjacent to and extending through said rear wall, and said second overdrive gear being rotatably mounted on that portion of said output shaft adjacent to and extending through said rear wall and being formed with a boss portion extending in the direction remote from said rear wall; and (ii) an overdrive synchronizer assembly comprising a spline element rigidly mounted on said output shaft rearwardly of said second overdrive gear and adjacent said boss portion remote from said rear walls, a synchronizing ring, a clutch hub integrally secured to said boss portion, and a slidable sleeve spline-coupled to said overdrive clutch hub and selectively acutated for axial movement rearwardly to mesh with said overdrive spline element for coupling said second overdrive gear to said output shaft, wherein the gear ratio of said first and second overdrive gears is such that when said second overdrive gear is coupled to said output shaft said output shaft is rotated at a higher rotational speed than said input shaft; and (h) a gear shift mechanism for selectively actuating one of said transmission synchronizer assemblies or said overdrive synchronizer assembly for changing the speed ratio of said input shaft to said output shaft as said gear transmission is shifted from one gear position to another, said gear shift mechanism including
  (i) a gear shift lever having a predetermined gear shift pattern wherein the position of said gear shift lever for actuating said overdrive synchronizer assembly is opposite to the position of said gear shift lever for actuating the transmission synchronizer assembly obtaining the highest transmission speed gear ratio;
  (ii) an axially movable fourth-and-third gear fork shaft coupled to said movable portion of said first assembly and an axially movable second-and-first gear fork shaft coupled to said movable portion of said second assembly;
  (iii) an axially movable overdrive-and-reverse gear fork shaft coupled to said slidable sleeve of said overdrive synchronizer assembly and moved axially forwardly to operatively engage said pair of reverse gears; and
  (iv) internal selection means responsive to the position of said gear shift lever for selectively engaging and moving one of said gear fork shafts wherein said fourth-and third gear fork shaft is moved forwardly for axially moving forwardly said first assembly portion into engagement with said first drive gear to establish the highest transmission speed gear ratio.

5. A gear transmission comprising:
(a) transmission case having front and rear end walls;
(b) an input shaft and an output shaft rotatably and coaxially disposed within said transmission case, said input shaft extending through said front end wall of said transmission case and said output shaft extending through said rear end wall of said transmission case;
(c) a countershaft rotatably disposed within said transmission case and parallel to said input and output shafts, said countershaft extending through said rear end wall of said transmission case;
(d) first and second drive gears housed in said transmission case, said first drive gear being mounted on said input shaft and meshed with said second drive gear mounted on said countershaft for transmitting torque from said input shaft to said countershaft;
(e) a plurality of pairs of transmission gears of different gear ratios housed in said transmission case for obtaining different speed ratios of said input shaft to said output shaft, wherein said pairs include a first speed gear rotatably fitted on said output shaft rearwardly from said first drive gear, a second speed gear rotatably fitted on said output shaft between said first drive and first speed gears, a third speed gear rotatably fitted on said output shaft between said first drive and second speed gears, said first, second, and third speed gears being meshed with corresponding first, second, and third speed gears fixedly mounted on said countershaft, and a first reverse speed gear fixedly mounted on said output shaft selectively engageable with a corresponding second reverse speed gear fixedly mounted on said countershaft;
(f) a plurality of transmission synchronizer assemblies mounted within said transmission case on said output shaft and selectively engageable with said first drive gear and said transmission forward speed gears rotatably mounted on said output shaft for coupling said gears to said output shaft, and wherein said plurality of assemblies include
  (i) a first assembly mounted between said first drive gear and said third speed gear rotatably fitted on said output shaft, said first assembly comprising a first clutch hub fixed to said output shaft, a first spline element fixed to said first drive gear, a second spline element fixed to said third speed gear rotatably fitted on said output shaft, a first slidable sleeve splined over said first clutch hub for axial movement and engagement with said first or second spline elements, a first synchronizer ring adjacent to said first spline element, a second synchronizer ring adjacent to said second spline elements, springs, and a plurality of shifting keys biased by said springs and interposed between said first clutch hub and said first sleeve;
  (ii) a second assembly mounted between said first and second speed gears rotatably fitted on said output shaft, said second assembly comprising a second clutch hub attached to said output shaft, a third spline element attached to said second speed gear rotatably fitted on said output shaft, a fourth spline element attached to said first speed gear rotatably fitted on said output shaft, a second slidable sleeve splined over said second clutch hub for axial movement and engagement with said third of fourth spline elements, a synchronizer ring adjacent to said third spline element, second springs, and a plurality of shifting keys biased by said second springs and interposed between said second clutch hub and said second sleeve, and wherein said first reverse speed gear is mounted on said second slidable sleeve of said second assembly;
(g) an overdrive mechanism mounted outside and adjacent to said rear end wall of said transmission case including
  (i) first and second overdrive gears continuously meshed with each other, said first overdrive gear being rigidly mounted on that portion of said countershaft adjacent to and extending through said rear wall, and said second overdrive gear being rotatably mounted on that portion of said output shaft adjacent to and extending through said rear wall and being formed with a boss portion extending in the direction remote from said rear wall;
  (ii) an overdrive synchronizer assembly comprising a spline element rigidly mounted on said output shaft rearwardly of said second overdrive gear and adjacent said boss portion remote from said rear walls, a synchronizing ring, a clutch hub integrally secured to said boss portion, a slidable sleeve spline-coupled to said overdrive clutch hub and selectively actuated for axial movement rearwardly to mesh with said overdrive spline element for coupling said second overdrive gear to said output shaft, springs, a plurality of shifting keys biased by said overdrive springs and interposed between said overdrive clutch hub and sleeve, and a stopper plate interposed between said overdrive clutch hub and said second overdrive gear for maintaining said overdrive shifting keys between said overdrive clutch hub and sleeve, and wherein the gear ratio of said first and second overdrive gears is such that when said second overdrive gear is coupled to said output shaft, said output shaft is rotated at a higher rotational speed than said input shaft; and (h) a gear shift mechanism for selectively actuating one of said transmission synchronizer assemblies or said overdrive synchronizer assembly for changing the speed ratio of said input shaft to said output shaft as said gear transmission is shifted from one gear position to another, and wherein the position of said gear shift mechanism in the gear shift pattern for actuating said overdrive synchronizer assembly is opposite to the position of said gear shift mechanism for actuating the one of said transmission synchronizer assemblies obtaining the highest transmission gear ratio, and wherein said gear shift mechanism includes
  (i) a gear shift lever having first, second, third, fourth, reverse, overdrive, and neutral positions and being disposed adjacent to said rear end wall of said transmission case;
  (ii) a slidable fourth-and-third gear fork shaft mounted for axial displacement;
  (iii) a first shift fork coupled to said first slidable sleeve of said first assembly and to said fourth-and-third gear fork shaft;
  (iv) a slidable overdrive-and-reverse gear fork shaft mounted for axial displacement, said shaft being parallel and adjacent to said fourth-and-third gear fork shaft and moved axially forwardly to operatively couple said pair of reverse gears;
  (v) an overdrive shift fork coupled to said slidable sleeve of said overdrive synchronizer assembly and to said overdrive-and-reverse gear fork shaft; and
  (vi) axially movable and rotatable rod selection means operatively coupled and responsive to said gear shift lever for selectively engaging said gear fork shafts for moving said slidable sleeves of said first synchronizer assembly and said overdrive synchronizer assembly, said first drive gear being coupled to obtain the fourth position when said first slidable sleeve of said first assembly is axially moved forwardly to mesh with said first spline element attached to said first drive gear, said second overdrive gear being coupled to obtain the overdrive position when said slidable sleeve of said overdrive assembly is axially moved rearwardly to mesh with said spline element rigidly mounted on said output shaft adjacent said boss portion, and said reverse gears being operatively coupled together to obtain the reverse position when said overdrive-and-reverse gear fork shaft is axially moved forwardly.

* * * * *

UNITED STATES PATENT AND TRADEMARK OFFICE
CERTIFICATE OF CORRECTION

PATENT NO. : 4,094,206
DATED : June 13, 1978
INVENTOR(S) : Yoshitaka Sogo et al

It is certified that error appears in the above-identified patent and that said Letters Patent are hereby corrected as shown below:

Claim 5:

Column 17, line 29, after "(a)" insert --a--;

Column 18, line 26, change "of" to --or--.

Signed and Sealed this

Twenty-eighth Day of November 1978

[SEAL]

Attest:

RUTH C. MASON
Attesting Officer

DONALD W. BANNER
Commissioner of Patents and Trademarks